United States Patent [19]

Best et al.

[11] Patent Number: 5,073,834
[45] Date of Patent: Dec. 17, 1991

[54] DISK FILE OR TAPE DRIVE WITH HIGH SERVO SAMPLE RATE EMBEDDING ADDITIONAL SERVO SECTORS WITHIN INDIVIDUAL DATA SECTORS

[75] Inventors: John S. Best, San Jose; Steven R. Hetzler, Sunnyvale; William J. Kabelac, Morgan Hill; David A. Thompson, San Jose, all of Calif.

[73] Assignee: International Business Machines Corporation, Armonk, N.Y.

[21] Appl. No.: 466,195

[22] Filed: Jan. 17, 1990

[51] Int. Cl.$^5$ .............................................. G11B 5/596
[52] U.S. Cl. ................................... 360/77.08; 360/135
[58] Field of Search ............................. 360/77.08, 135

[56]  References Cited
U.S. PATENT DOCUMENTS 4,424,543  1/1984  Lewis et al. ...................... 360/77.08

OTHER PUBLICATIONS

B. Smith, "Servo Zones Embedded in Data Tracks Solve Old, But Create New Problems" *Computer Technology Review* Spring 1988 pp. 45, 46 & 48.
IBM Technical Disclosure Bulletin vol. 25, No. 2 Jul. 1982 pp. 776-777 "Dicell Gray Coding of Disk File Track Addresses" D. H. Pennington.

*Primary Examiner*—Aristotelis Psitos
*Assistant Examiner*—David L. Robertson
*Attorney, Agent, or Firm*—Henry E. Otto, Jr.

[57]  ABSTRACT

A method and means is described for writing data on a recording medium, such as a disk or tape, containing servo samples in such manner that the number of servo samples is increased with a minimal increase in overhead (non-data) regions. The tracks on the medium are divided into a plurality of maxi sections, each of which contains all fields with servo and associated overhead information and also a data field. At least one micro servo section containing only a portion of said information is located within each data field.

As each micro servo section passes by an associated recording head, writing and reading of data is temporarily interrupted, but resumed when the micro servo section moves beyond the head, in such manner as to require minimal resynchronization of said data during reading.

Using a phase continuous clock, data is written in both portions of a data field to either side of each micro servo section in one pass of the disk or tape relative to the head. The micro servo sections contain no timing reference address mark and require no data encoder/decoder flush or synchronization byte to resume reading in the portion of the data field following each micro servo section.

17 Claims, 2 Drawing Sheets

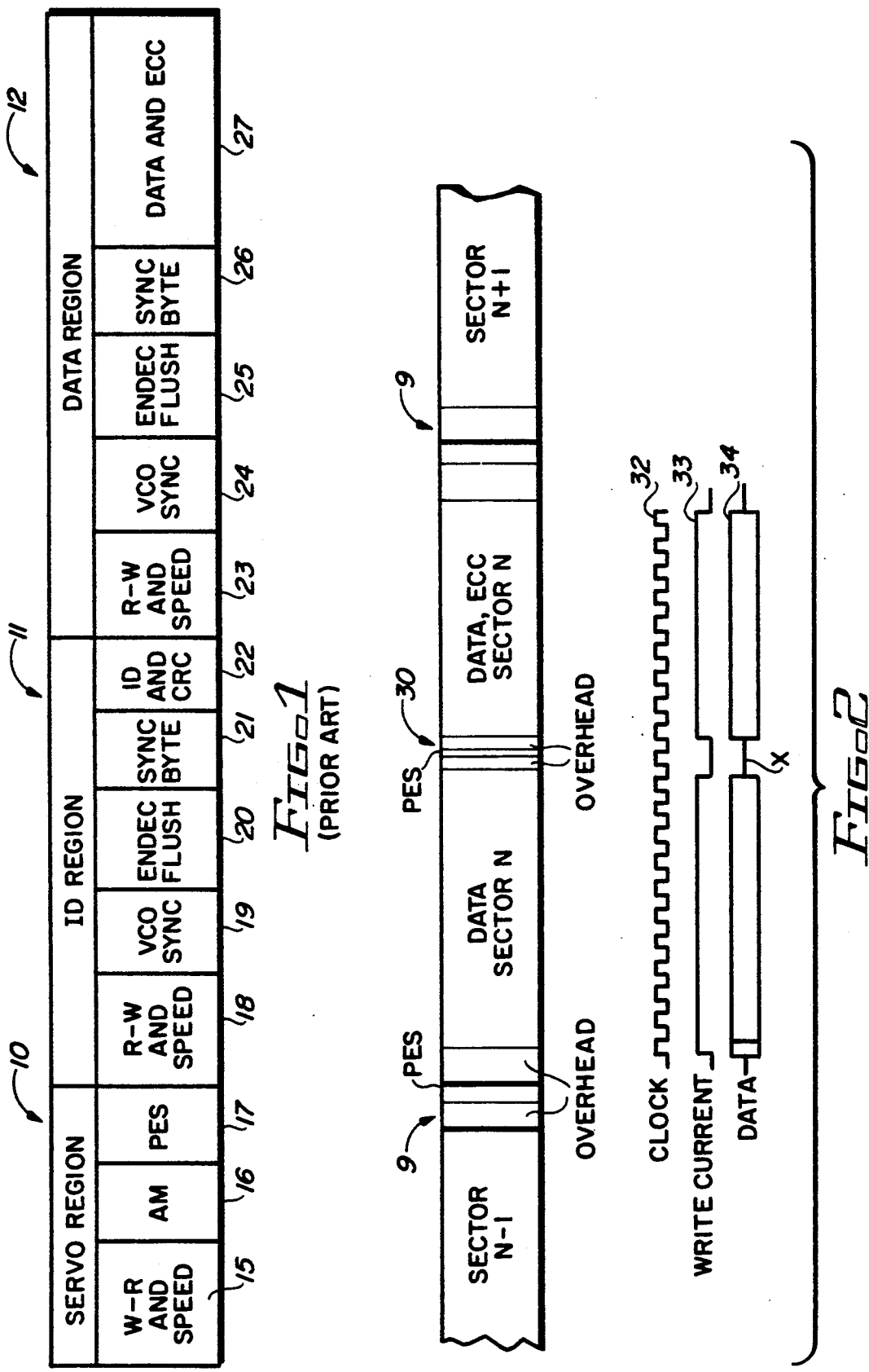

DISK FILE OR TAPE DRIVE WITH HIGH SERVO SAMPLE RATE EMBEDDING ADDITIONAL SERVO SECTORS WITHIN INDIVIDUAL DATA SECTORS

CROSS-REFERENCE TO RELATED APPLICATION

The present invention is related to application U.S. Ser. No. 07/466,194, entitled "Sectored Servo Independent of Data Architecture", filed concurrently herewith and assigned to the assignee of the present invention.

FIELD OF THE INVENTION

This invention relates to methods and means for writing data onto a recording medium containing servo samples, and more particularly to a method and means for increasing the number of servo samples on a recording disk in a disk file or a tape in a tape drive, with a minimal increase in overhead (non-data) regions in disk files or tape drives that use servo arrangements in conjunction with a fixed-block-architecture (FBA) format.

BACKGROUND OF THE INVENTION

All disk files require some means of determining the radial position of the read-write heads over the disks so that the heads can be accurately positioned over any desired track. Typically this is done by putting servo information on one or more of the disk surfaces for reading by magnetic or optical read heads. Some disk files have servo information only on a dedicated surface of one disk in a disk stack. However, more recently the trend is to store this servo information interspersed with the data stored on each disk surface. This latter approach is preferred because it can be implemented at low cost without extra components beyond those required for storing data and because it provides the servo information at the data surface being accessed, thereby eliminating all thermal sources of track misregistration (TMR).

In a disk file in FBA format, each circumferential track on the disk is divided into a number of sectors. Each sector consists of a factory written portion and a user written portion. The factory written portion is the servo region which contains the servo information and timing information required to mark the start of the sector. The user written portion consists of a data region containing the actual data to be stored and possibly an identification (ID) region which identifies the sector and marks bad sectors. A large amount of overhead, in which no user data can be stored, is associated with each sector.

Fast servo systems require frequent position measurements; i.e., a high servo sample rate. In sectored servo arrangements, this is achieved by dividing each track on the disk into a large number of small sectors. As a result, a large fraction of the potential information capacity of the disk file undesirably is used for the overhead associated with each sector. For example, if the servo sample rate is doubled, it will double all of the non-data overhead.

The most pertinent prior art of which applicants are aware is an article in the Spring 1988 issue of Computer Technology Review at pp. 45-48. This article describes a method for reducing this overhead to a very limited degree in an arrangement which essentially converts a FBA disk into a CKD format. To accommodate variable length data records extending over a number of data sectors, an equivalent to the ID region is put in only the first data sector of the record. This saves some overhead if the data records are long, but none, of course, if the record is less than a sector in length. Each sector may be independently written after leaving the factory; thus, complete resynchronization is required at each data sector. All other overhead fields including full automatic gain control (AGC), write-to-read and read-to-write recovery and synchronization fields, are therefore still required.

There is a need for an improved method and means, transparent to the user, for increasing the servo sample rate in either a disk file or a tape drive using the FBA format, and for achieving this increase with a minimal increase in the overhead.

SUMMARY OF THE INVENTION

A method and means is described for writing data on a recording medium, such as a disk or tape, containing servo samples in such manner that the number of servo samples is increased with a minimal increase in overhead (non-data) regions. The tracks on the medium are divided into a plurality of "maxi" sections, each of which in conventional FBA contains all servo and identification (ID) fields with overhead information and also a data field. At least one "micro" servo section containing only a portion of the overhead information is located within each data field.

As each micro servo section passes by an associated recording head, writing and reading of data is temporarily interrupted, but it is resumed, when the micro servo section moves beyond the head, in such manner as to require minimal resynchronization of said data during reading.

Using a phase continuous clock, data is written in both portions of a data field to either side of each micro servo section in one pass of the disk or tape relative to the head. The micro servo sections contain no timing reference address mark and require no data encoder/decoder (ENDEC) flush or synchronization byte to resume reading in the portion of the data field following each micro servo section.

As implemented in a disk drive, the maxi sections and the micro servo sections are sectors consisting of a plurality of concentric tracks; whereas for a tape drive, the sections consist of a plurality of parallel longitudinally extending tracks. In both cases, however, on each given track all maxi sectors or sections are of equal length.

BRIEF DESCRIPTION OF THE DRAWINGS

FIG. 1 is a diagram, not to scale, of a conventional servo sector for a disk file according to the prior art, showing the overhead and data regions associated with each sector;

FIG. 2 is a diagram, not to scale, showing a micro servo sector according to the invention with minimal overhead between two conventional sectors;

DESCRIPTION OF PREFERRED EMBODIMENTS

I. Introduction—Description of Prior Art

Figure 3:
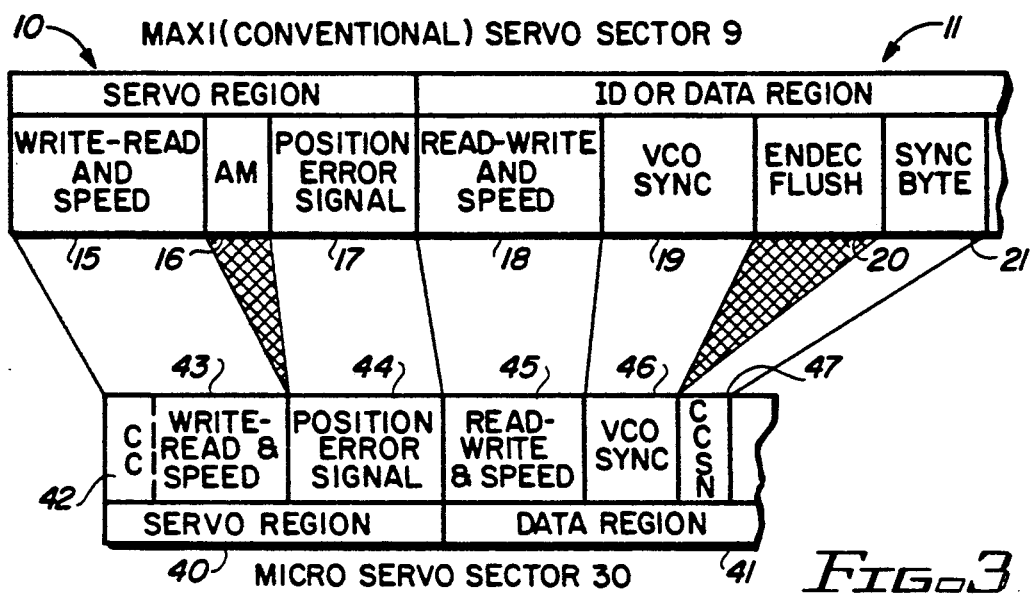
FIG. 3 is a composite diagram, also not to scale, showing how overhead fields in the conventional sectored servo format are eliminated or reduced in length in a micro servo sector, according to the invention.

To facilitate understanding the invention, there is diagrammatically shown in FIG. 1 the various items of overhead associated with each sector of a conventional prior art disk file formatted in FBA. Each conventional sector 9 consists of a servo region 10, an ID region 11 and a data region 12, which can be written at different times. These regions consist of various fields, which will now be described.

In servo region 10:

(a) Write-read and speed field 15 is written at the factory and can be partially rewritten thereafter. It allows time for the drive electronics to switch from write to read. This includes both logic delays and actual time for the write driver current to decay to zero. To account for variations in rotational speed of the disk, a time is added equal to the relative control speed multiplied by the distance from the previous sector from which absolute timing was last established. Also, shut-off of write current must not begin until a minimum number of clock cycles after the time when the last possible data bit is written to a data encoder/decoder (ENDEC) to assure that the encoded data bits are flushed and written to the disk. In some cases, additional data bits must be sent to the ENDEC to leave its internal shift register in a known state. Finally, field 15 allows time for settling out the transients induced in a read preamplifier by the write current, as well as settling head magnetic domain transients and adjusting the automatic gain control (AGC) in the read channel.

(b) Address mark (AM) field 16 is written at the factory and must not be overwritten. It is required to identify the beginning of the sector 9. It is an asynchronous, absolute timing reference that provides the basis for locating the other fields. The AM field is frequently implemented as a gap; i.e., as a long period with no magnetic transitions on the disk, followed by a single transition to mark the beginning of a sector.

(c) The position error signal (PES) field 17 is also written at the factory and must not be overwritten. It contains the information needed to determine the track position of the recording head. It ca be encoded in any of a number of ways that are described in the prior art and form no part of the present invention.

In ID region 11:

(a) Read-write and speed field 18 is written at the factory and can be partially overwritten after the disk leaves the factory. Fields 19-27 that follow the PES field 17 can be rewritten. Field 18 provides the logic and time needed to insure that PES field 17 is not overwritten. Field 18 also provides time for the write current to rise to its full value. Field 18 is typically much shorter than the write-read field 15. Field 18 and all subsequent fields are normally written using data that passes through the ENDEC shift register.

(b) Voltage controlled oscillator synchronization (VCO sync) field 19 is required to give the variable frequency read clock sufficient time to phase lock to the upcoming ID field 22.

(c) ENDEC flush field 20 indicates the number of bits the read channel decoder must receive in order to put it into a known state called ENDEC flush. (Field 20 can range in size from a few bits to close to 10 bytes, depending upon the code used.)

(d) Sync byte field 21 indicates the sync byte needed to align the read bits on correct byte boundaries.

(e) ID and CRC field 22 includes as the ID portion a sector identifier and bad sector flag and as the CRC portion a cyclic redundancy check for errors in the reading of the ID.

In data region 12:

(a) Fields 23-26 correspond to the ID fields 18-21, respectively, with these two exceptions: (1) field 23 can be completely rewritten; and (2) the function of sync byte field 26 is to tell the controller when the VCO synchronization and ENDEC flush end and the real data (which is contained in field 27) begins.

(b) Data and error correction code (ECC) field 27 stores the user data together with the error correction code.

(c) Each data region in a conventional sectored servo system is completely independent of data regions in the other sectors. They can be written and read at separate times.

II. Description of the Invention

According to the invention, one or more short "micro" servo sectors 30 with minimal overhead are inserted on a disk in the data and ECC field 27 for each sector; and only at the beginning of each sector are the conventional servo, ID and data regions 10,11,12 used. The micro servo sectors 30 are positioned such that, on each track, the PES fields 17 and 44 for all maxi sectors, respectively, are equally circumferentially spaced.

As illustrated in FIG. 2, a single micro servo sector 30 is inserted on the disk in the middle of data and ECC field 27 of sector N; and a conventional, (hereinafter "maxi") sector 9 including its associated overhead are disposed only at the beginning of sector N. Using a phase continuous clock 32, data is written in both portions of the data field 27 to either side of each micro servo sector in a single pass of the disk. However, while each micro servo sector 30 passes by the head (at X), the write current 33 to the head and the data stream 34 and clock input to a data encoder/decoder (ENDEC) 52 (see FIG. 4) are temporarily interrupted.

According to the invention and as best shown in FIG. 3, the size of some of the fields is reduced and other fields are eliminated, thus substantially reducing the overhead in each micro servo sector 30.

More specifically, micro servo sector 30 consists of a servo region 40 and a data region 41. In servo region 40, code constraint portion 42 of write-read and speed field 43 is the longest part of said field. It consists of bits to prevent the decaying write current from writing a transition too close to the last data transition. (By contrast write-read and speed field 15 of maxi sector 9 includes a code constraint portion also; but it is so minute compared to the remainder of field 15 that it is considered negligible.) By very closely controlling the phase-locked spindle speed of the disk drive motor, the speed variation part of the write-read field 43 can be decreased to a single clock period.

According to a feature of the invention, micro servo sectors 30 preferably are read only during seek and read operations, and not during write operations. High servo sample rate is required primarily during the seek operation when the head must quickly settle from a rapidly moving condition to accurately follow a given track. By not reading during write operations, it is unnecessary to allow time for the read preamplifier and head magnetic domains to fully recover from their write transients and there is no need to provide time for AGC settling in the read channel. The lower bandwidth derived from the conventional maxi sectors is usually acceptable during track following while writing. If a wide bandwidth is required during track following while writing, the micro servo sectors 30 would be read, requiring a somewhat longer write-to-read field 43 for recovery. Since the ENDEC shift register 52 is not clocked while each micro servo sector 30 with its associated overhead fields passes the head, no pad or gap is necessary to assure that it remains in a known state.

In micro servo sector 30, the AM field is eliminated. Timing for position detection is based on time from the address mark field 16 at the beginning of the maxi sector 9, and timing for write and read is based on clock cycles from the beginning of data field 27.

PES field 44 is shortened and contains both an abbreviated Gray code and position error signal information. Gray code is used, as in the prior art, to allow an accurate reading of track number when the servo head is positioned on a track or anywhere between two adjacent tracks. The encoding method used may be as described in the July 1982 issue of the IBM Technical Disclosure Bulletin at pp. 776-777. Since the full Gray code in the PES field 17 at the beginning of maxi sector 9 has determined the complete track number position of the head, PES field 44 in the micro servo sector 30 need only verify that the head is positioned at a specific track within a relatively narrow band of tracks adjacent the track determined at the maxi servo sector. Since the full track number is thus not required in the micro servo sectors 30, an abbreviated Gray code is used for such verification. For example, if abbreviated to two bits, the Gray code could identify plus or minus one track within a band of four; and if abbreviated to three bits, to within a band of eight tracks. This abbreviated Gray code further reduces the overhead in the micro servo sectors 30.

The read-write and speed field 45 is substantially identical with the corresponding field 18 in the maxi sector 9.

Because the data on either side of micro servo sector 30 including its associated overhead fields is written phase continuously, the read VCO does not require a long synchronization period at the end of the micro servo region. The VCO is set to coast through the micro servo region without changing frequency. With most VCO's, this coast can be induced by gating off the detected data from the VCO while the micro servo sector 30 is passing the head. The gate is reopened at the beginning of a short VCO sync field 46. Field 46 is not written with data passed through the ENDEC encoder as is usual in conventional sectored servo systems. Field 46 and the following code constraint and sync nibble field 47 are generated with logic. Since micro servo sector 30 is short, there is only a small phase drift in the VCO with reference to read data. In a conventional maxi sector, at the start of the data region 12, VCO sync field 24 must be used to adjust the VCO from an arbitrary phase and to make some adjustment for any frequency difference between a crystal reference clock and the read data. However, in the micro servo sector 30, VCO sync field 46 can be reduced to from a few bits for a highly stable VCO design to about half those required in the servo region of a maxi sector for a less stable VCO design.

The ENDEC flush field is also eliminated. This is possible because, at the end of the previous data subfield, clock 32 to the ENDEC is gated off, with the result that the ENDEC holds its state. At the first data clock after sync nibble field 47, ENDEC clock 32 is gated on. Hence, the first encoded data bit is properly clocked into the ENDEC, exactly as if micro servo sector 30 had not been present and the data field had been continuous.

Because ENDEC initialization is not required, there is no need for a sync byte. If the VCO phase drift through each micro servo sector 30 is known to be small enough, the VCO clocks can be counted and gating turned on to start the next data subfield at the correct clock cycle with no sync nibble. The code constraint assures that the last VCO sync transition will not be too close to the first data transition. If the VCO drift is potentially more than one-half clock cycle, however, the exact clock cycle corresponding to the start of the data subfield cannot be determined without a sync nibble. The sync nibble need only be some pattern which can be distinguished from the VCO sync pattern. For example, for a 2,7 code, this can be achieved by using a 100100 . . . sync pattern, with one or two extra 0's following as the sync nibble satisfying the coding constraint. The sync nibble detector then looks for 000 as the mark indicating the end of the VCO sync field 46. This triggers the gating to start the reading of the following data subfield by the ENDEC.

It will thus be seen that, with the disk formatted in fixed block architecture, one or more micro servo sectors 30 are spaced circumferentially within the data and ECC field 27 for each maxi sector 9. Write-read and speed field 43 including code constraint 42 is shortened; the AM (address mark) field is eliminated, the PES field 44 is shortened by use of an abbreviated Gray code; the ENDEC flush field is eliminated; and there is no need for a sync byte. Read-write and speed field 45 is essentially the same length as in the servo of conventional sector 9.

The overhead information for the micro servo sector 30 consists solely of bits containing position information and up to 80 bits to either side thereof. A typical micro servo sector 30 for use with the conventional or maxi sector 9 might typically comprise 2 bits in the code constraint portion 42 and 10 bits in the remaining portion of write-read and speed field 43; 130 bits in position error signal field 44; 10 bits in read-write and speed field 45; 30 bits in VCO sync field 46; and 3 bits in code constraint and sync nibble field 47.

By contrast, the servo region of a conventional sector 9 may, for example, typically comprise 200 bits in write-read and speed field 15; 25 bits in AM field 16; 170 bits in position error signal field 17; 10 bits in read-write and speed field 18; 140 bits in VCO sync field 19; 8 bits in ENDEC flush field 20; and 8 bits in sync byte field 21.

During a write operation, data is written in field 27 at one time, and the micro servo sectors 30 are not overwritten. Also, use of the abbreviated Gray code with micro servo sectors 30 allows them to be used for seek as well as during settling.

Figure 4:
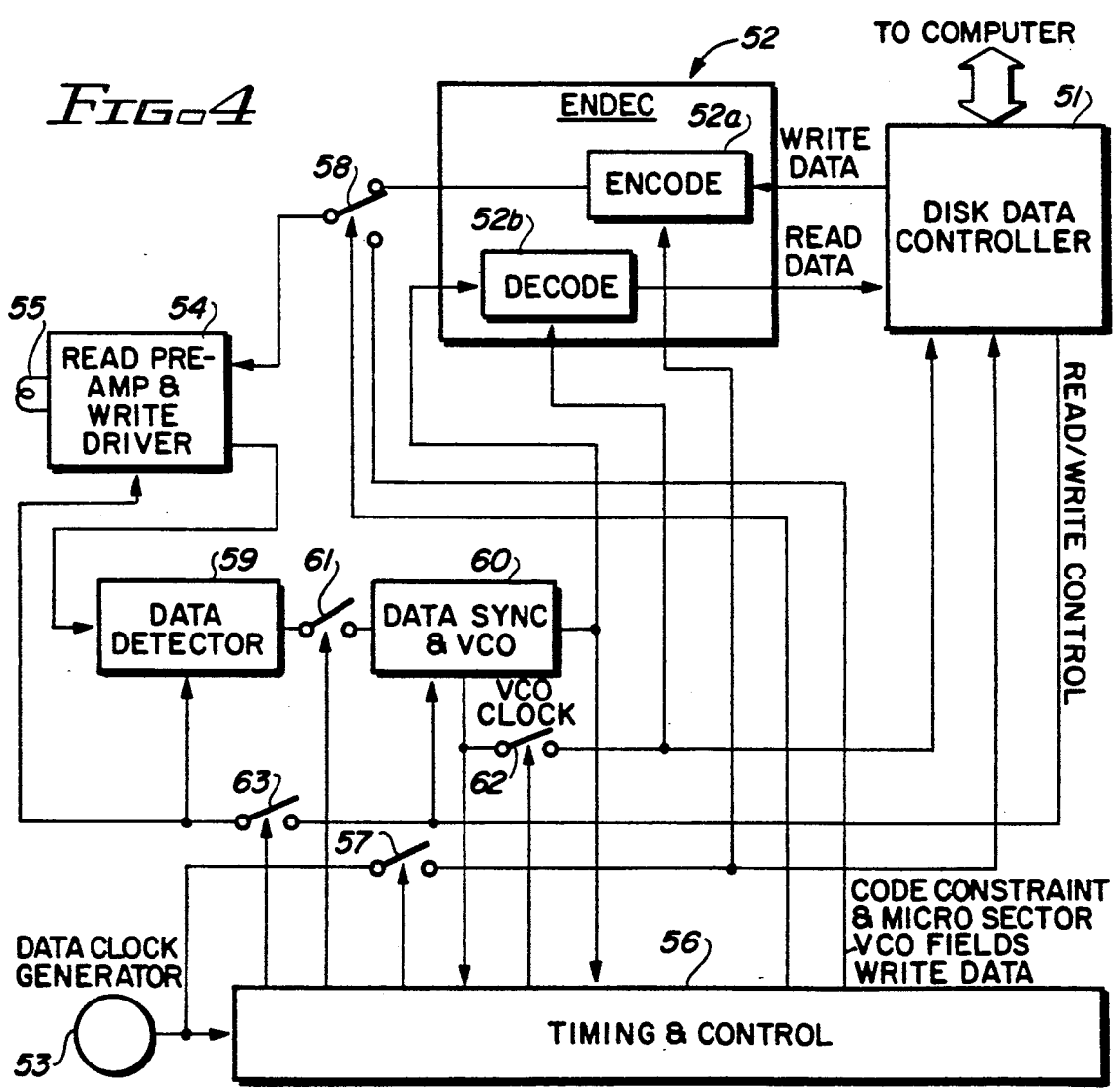
FIG. 4 is a block diagram of the micro servo sector channel.

Implementation of Invention—FIG. 4

(A) To Write Data

As illustrated, a conventional disk data controller circuit 51 generates the serial bits required for the servo, ID and data regions 10,11,12, respectively, of each maxi sector 9. A clock generator 53 generates data clock cycles that are used to transfer uncoded data from disk data controller 51 to an encode section 52a of an encoder/decoder (ENDEC) 52, and to transfer coded data from the ENDEC to a write driver 54 for causing a magnetic head 55 to write data on a magnetic recording disk (not shown).

Timing and control logic 56 closes switches 57,61,62,63 and holds switch 58 in the position in which it is shown in FIG. 4 until said logic, by counting the generated data clock cycles, determines the precise position of the start of the next micro servo sector 30.

As each micro servo sector 30 moves past head 55, switch 58 is operated to transfer code constraint bits from field 42 (FIG. 3) from timing and control circuit 56 to write driver 54. Concurrently, switch 57 is opened to interrupt the data clock cycles from generator 53 to ENDEC encode portion 52a and disk controller 51, thereby freezing the states of both the ENDEC and disk controller. Switch 63 is then opened to interrupt the write current to write driver 54 and enable preamp 54 and data detector 59 to read the servo information from micro servo sector 30. After PES field 44 passes head 55, switch 63 is closed to restore write current; and VCO resync field 46 (if used) and code constraint and sync nibble field 47 are transferred from timing and control circuit 56 to write driver 54. Switch 58 is then restored to the position in which it is shown, and switch 57 is closed to resume the transfer of data from disk data controller 51 and ENDEC 52 via head 55 to the disk.

(B) To Read Data

During reading of data, signals from head 55 are amplified by preamplifier 54 and converted to digital pulses by data detector 59. In data sync and VCO module 60, a VCO is phase-locked to the detected data pulses and used to synchronize the data to the VCO clock. The VCO clock is used to transfer encoded data from data sync and VCO module 60 to disk data controller 51 via the decode section 52b of ENDEC 52. Timing and control logic 56 counts VCO clock cycles to determine the precise start position of each micro servo sector 30. At the start of each micro servo sector 30, timing and control logic 56 opens switch 61 to gate off the detected data from sync and VCO module 60. This causes the VCO to coast at a constant frequency. Also, while each micro servo sector 30 passes head 55, switch 62 is opened to stop the VCO clock input to decode section 52b of ENDEC 52 and disk controller 51. This causes the states in the decode section 52b and in disk data controller 51 to be frozen while each micro servo sector passes head 55. At the end of the PES field 44 (FIG. 3) and beginning of VCO resync field 46, switch 61 is closed to direct the VCO resync bits to data sync and VCO module 60. This allows the VCO properly to reestablish phase lock with the data. When the sync nibble is detected by timing and control logic 56, switch 62 is closed to recommence the VCO clock input to ENDEC decode section 52b and to disk data controller 51, thus resuming the transfer of data to the ENDEC and disk data controller.

The method and means herein disclosed increases the servo position error signal bandwidth for both magnetic and optical direct access storage devices, thereby significantly reducing seek times, settling time and track misregistration for sectored servo disk files. By reducing thermal track misregistration and misregistration due to actuator tilt to negligible levels, high track per inch (TPI) and low cost disk file designs are possible. Finally, because of enhanced performance and reduced cost, an increased TPI potential may be preferred to a dedicated servo even in a disk file with many disks.

Implementation for a Tape Drive

When applied to a tape drive, maxi sections and micro servo sections are substituted for the maxi sectors and micro servo sectors, respectively. A plurality of parallel recording tracks on the tape are divided into at least two maxi sections of equal length. Each maxi section contains all overhead fields and a data field; and at least one micro servo section containing only a portion of the overhead fields is located within each data field. As each micro servo section passes by a recording head, write current to the head is interrupted, as is the stream of data and clock input to a data encoder/decoder. As each micro servo section passes beyond the head, write current, data stream and clock input are restored without requiring complete resynchronization. All overhead information is contained in a combined servo region and ID region of the maxi section. Data is written in both portions of a data field to either side of each micro servo section using a phase continuous clock. A read data VCO is coasted through each micro servo section without change in frequency, and at the end of said section an abbreviated VCO synchronization field is generated for resynchronizing the VCO with the data.

No timing reference address mark or encoder/decoder flush or synchronization byte is required to resume writing the portion of the data field following the micro servo section. Each micro servo section consists solely of bits containing position information and bits to each side thereof for controlling the interruption and restoration of the write current and of the data stream and clock input to the encoder/decoder.

As hereinafter used in the claims, the term "section" is intended, unless otherwise indicated, to generically cover a sector of concentric tracks on a disk or a section of parallel tracks on a tape.

While the invention has been shown and described with respect to preferred embodiments thereof, it will be understood by those skilled in the art that changes in form and detail may be made in these embodiments without departing from the scope and teaching of the invention. Accordingly, the method and apparatus herein disclosed are to be considered merely as illustrative, and the invention is to be limited only as specified in the claims.

We claim:

1. A method of writing data onto a recording medium containing servo samples in which the number of servo samples on the medium is increased with a minimal increase in overhead (non-data) regions, comprising the steps of:

dividing tracks along the medium into a plurality of maxi sections, each of which contains a servo field and an associated synchronization field and a data field, and into at least one micro servo section which is within each of said data fields and contains a resynchronization field which is shorter than the synchronization field and contains and requires only a subset of the information in the synchronization field to resume reading the portion of the data field following each said micro servo section;

moving the medium relative to at least one recording head;

as each such micro servo section passes by an associated head, interrupting writing and reading of data; and as each micro servo section passes beyond the associated head, resuming writing of data.

2. The method of claim 1, wherein said subset consists solely of bits containing position information and bits to each side thereof for controlling the interruption and resumption of the writing and reading of data.

3. The method of claim 1, wherein the medium is formatted in fixed block architecture with the maxi sections on each respective track being of equal length.

4. The method of claim 1, including the step of:
using a phase continuous clock, writing data in both portions of a data field to either side of each micro servo section in one pass relative to the associated head.

5. The method of claim 1, including the steps of:
using a Gray code, identifying the number of the track being accessed by the associated head; and
using in each micro servo section only a portion of the Gray code used in the maxi section to identify the track number of the associated head, verifying at each said micro servo section that the same numbered track is still being accessed.

6. The method of claim 1, including the steps of:
using a phase continuous clock, writing data in the data fields;
reading data by holding a read data VCO through each said micro servo section without change in frequency; and
at the end of each said micro servo section, generating during writing of data the resynchronization field for resynchronizing the VCO with said data during reading of data.

7. The method of claim 1, including the steps of:
during reading of data, gating off detected data from a VCO through each said micro servo section;
during writing of data, generating the resynchronization field and then a code constraint and synchronization nibble; and
during reading of data, gating on the detected data to the VCO at the beginning of said resynchronization field.

8. The method of claim 1, including the steps of:
generating a first code constraint at the beginning of a micro servo section for preventing subsequent servo information from interfering with data immediately ahead of the code constraint, thereby eliminating the need for the data encode/decoder flush; and
generating a second code constraint at the end of each micro servo section for preventing prior servo information from interfering with data immediately following the micro servo section.

9. A recording medium, characterized in that tracks on the medium are formatted into a plurality of maxi sections, each containing a servo field and an associated synchronization field and a data field, and all maxi sections on a respective track are of equal length, and at least one micro servo section within each of said data fields contains a resynchronization field which is shorter than the synchronization field and contains only a subset of the information in the synchronization field.

10. The medium of claim 9, further characterized in that said resynchronization field consists solely of bits containing position information and bits to each side thereof for controlling the interruption and restoration of the writing and reading of data.

11. The recording medium of claim 9, wherein the medium is a disk and the maxi and micro sections are sectors.

12. A method of writing data onto a disk containing servo samples in which the number of servo samples on the disk is increased with a minimal increase in overhead regions, comprising the steps of:
dividing tracks on the disk circumferentially into a plurality of maxi sectors, each of which contains fields with servo and associated overhead information and a data field, and into at least one micro servo sector which is within each data field and contains only a portion of said information, all maxi sectors in each respective track being of the same length but of varying length track-to-track;
rotating the disk relative to at least one recording head;
using a phase continuous clock, writing data in the data fields;
reading data by holding a read data VCO through each said micro servo sector without change in frequency;
during reading of data, gating off detected data from the VCO through each said micro servo sector;
at the end of each said micro servo sector, generating during writing of data an abbreviated VCO synchronization field and then a code constraint and synchronization nibble for resynchronizing the VCO with said data during subsequent reading of data;
during said subsequent reading of data, gating on the detected data to the VCO at the beginning of said abbreviated VCO synchronization field; and
interrupting writing and reading of data as each such micro servo sector passes by an associated head, whereby as each micro servo sector passes beyond said associated head, writing of data is resumed in such manner as to require minimal resynchronization of said data during reading.

13. The method of claim 12, wherein each maxi sector and micro servo sector have position error signal (PES) fields, and including the step of:
positioning each maxi sector and micro servo sector on each track such that all PES field are equally circumferentially spaced.

14. A disk file comprising:
at least one recording disk formatted in FBA with tracks divided into a plurality of substantially identical maxi sectors, each of which contains a servo field and an associated synchronization field and also a data field, and at least one micro sector located within each data field and containing a resynchronization field which is shorter than said synchronization field and contains only a subset of the information in the synchronization field;
means for rotating each disk relative to at least one recording head;
means, including said heads, for writing data in the data fields;
phase continuous clocking means for synchronizing said data writing means;
means, including said heads, for reading data in the data fields;
other clocking means for synchronizing said data reading means with the data to be read;
means for interrupting writing and reading of data as each micro servo sector passes by an associated one of the heads; and
means for resuming writing and reading of data as each micro servo sector passes beyond said associated head for resynchronizing said data reading means with said other clocking means using the short resynchronization field, whereby the number of servo samples is increased in a manner transparent to the user with minimal increase in non-data regions.

15. The disk file of claim 14, wherein said data writing means writes data in both portions of a data field to either side of each micro servo section in one pass of the disk relative to the associated head.

16. A disk file comprising:
at least one recording disk formatted in FBA with tracks divided into a plurality of substantially identical maxi sectors, each of which contains all fields with servo and associated overhead information and also a data field, and at least one micro servo sector located within each data field and containing only a portion of said servo and overhead information;
means for rotating each disk relative to at least one recording head;
means, including said heads, for writing data in the data fields;
phase continuous clocking means for synchronizing said data writing means;
means, including said heads, for reading data in the data fields;
a read data VCO;
means for reading data by holding the VCO through each said micro servo sector without change in frequency;
means operative during operation of said writing means for generating the resynchronization field at the end of each said micro servo sector for resynchronizing the VCO with said data during subsequent operation of said reading means;
means for interrupting writing and reading of data as each micro servo sector passes by an associated one of the heads, said means including (a) means operative during operation of said reading means for gating off detected data from the VCO through each said micro servo sector;
(b) means operative during operation of said writing means for generating an abbreviated VCO synchronization field and then a code constraint and synchronization nibble; and
(c) means operative during said subsequent operation of said reading means for gating on the detected data to the VCO at the beginning of said abbreviated VCO synchronization field; and
means for resuming writing and reading of data as each micro servo sector passes beyond said associated head, whereby the number of servo samples is increased in a manner transparent to the user with minimal increase in non-data regions.

17. A method of writing data onto a recording medium containing servo samples in which the number of servo samples on the medium is increased with a minimal increase in overhead (non-data) regions, comprising the steps of:
dividing tracks along the medium into a plurality of maxi sections, each of which contains a servo field and an associated synchronization field and a data field, and into at least one micro servo section which is within each of said data fields;
preserving the contents of a data encoder/decoder throughout the micro servo section;
moving the medium relative to at least one recording head;
as each such micro servo section passes by an associated head, interrupting writing and reading of data; and
as each micro servo section passes beyond the associated head, writing the preserved contents into that portion of the data field following each said micro servo section, whereby the need for data encoder/decoder flush is eliminated.

* * * * *